A
United States Patent Office 2,728,706
Patented Dec. 27, 1955

2,728,706

FAT COMPOSITION FOR INTRAVENOUS INJECTION

George Barsky, New York, N. Y., assignor to E. F. Drew & Co., Inc., New York, N. Y., a corporation of Delaware No Drawing. Application November 6, 1951, Serial No. 255,149

7 Claims. (Cl. 167—66)

The present invention is directed to edible compositions, more particularly to fat containing emulsions adapted for intravenous injection for therapeutic purposes.

It has become common practice to administer emulsions of fats into human subjects for various purposes, particularly for providing nutrition under certain conditions. Various oils and fats have been so applied and in general they have had the effect of providing the desired caloric intake.

Among the fats so used was coconut oil which was suitably emulsified and injected into the system. This caused a substantial rise in temperature of the patient and in many cases such an effect became serious. Other fats have also been proposed for this purpose but they usually suffer from various disadvantages, such as a tendency to block and thus to interfere with the normal circulation in the system.

The present invention is intended and adapted to overcome the difficulties and disadvantages inherent in the production of fat emulsions for the purpose described, it being among the objects thereof to provide a synthetic fat which is highly nutritious and which when injected into the human system in the form of an emulsion does not cause any substantial rise of body temperatures.

It is also among the objects of the present invention to provide a composition of the type described in which no blocking of any veins takes place, and which composition is readily assimilable by the body.

It is further among the objects of the present invention to provide a composition of the above described type which may be made into an emulsion with other substances, such as sugars, proteins and the like in order to provide nitrogen, as well as other elements, for assimilation by the body.

In practicing the present invention there is provided a mixture of fatty acids derived from the coconut type of oil, which contains a series of fatty acids having from 6 to 18 carbon atoms, the acids all having even numbers of carbon atoms. This type of oil is described in Patent No. 2,585,027, dated February 12, 1952, in the name of H. H. Mueller and in other literature. Such a mixture of fatty acid is suitably treated as by fractional distillation, preferably in a vacuum so as to remove therefrom the major portion or substantially all of the lower fatty acids having 6, 8 and 10 carbon atoms. The mixture of fatty acids remaining from the fractional distillation and containing principally fatty acids having from 12 to 18 carbon atoms, is esterified with glycerine to form a substantially neutral unhydrogenated glyceride of the mixture of the higher fatty acids. The method of esterifying may be any of those known to the art wherein glyerine and the mixed fatty acids are heated either with or without a catalyst of esterification at a suitable temperature up to, say, 250° C., with removal of water formed in the reaction. The mixed esters so formed may be purified as is well-known, to remove residual free fatty acids and to bleach and clarify the resulting oil.

The mixture of fatty acids is usually of the following composition:

| | Percent |
|---|---|
| Lauric acid | 40 to 85 |
| Myristic | 6 to 8 |
| Palmitic, oleic and stearic | 10 to 40 |
| Capric and caprylic acids | .9 to 12 |

Substantially neutral glyceride esters of the above fatty acids within the ranges set forth above are made up into emulsions with water and containing usually other constituents such as sugar and protein substances. The amount of oil present may vary greatly and usually it is present in amounts ranging from 10% to 25%. An emulsifying agent of an assimilable character is present, such emulsifiers being well-known in the art.

The oils used in the compositions of the present invention have a low degree of unsaturation having an iodine number usually under 25. The oil has a low melting point and is liquid at body temperatures. Compositions of this type have been found to have no pyrogenic effect on the human body when injected intravenously into the system.

The following are specific examples of compositions made in accordance with the present invention.

Example 1

A mixture of fatty acids of a coconut type oil having the following composition is used:

| | Percent by weight |
|---|---|
| Lauric+myristic | 93 |
| Capric+caprylic | 7 |

This mixture contains a major proportion of lauric and myristic acids and is substantially free from water-soluble acids. It is esterified as usual with glycerine and refined to give a substantially neutral oil. The oil is then made up into the following composition:

| | Parts by weight |
|---|---|
| Oil | 202.0 |
| Glucose (50%) | 55.0 |
| "Amigen" (10%) | 22.0 |
| Gelatin (6%) | 26.5 |
| Water to make | 1000.0 |

The percentages given with respect to the above constituents represent the amounts present in water solution. "Amigen" is a protein hydrolysate, being a monantigenic pancreatic hydrolysate of casein, three-fourths of which has been converted to amino acids and one-fourth to simple peptides. It is described in an article by Floyd and Page in Amer. Rev. Tuberc. 48 (1943), pages 174–176. The constituents are mixed in suitable equipment to produce a uniform emulsion with the various elements thereof in very finely divided form. The emulsion is sterilized before use. When it is injected intravenously, it is found that the temperature of the patient remains normal; the composition is readily assimilated and the patient gains weight.

Example 2

A fatty acid composition having the following analysis is used:

| | Percent |
|---|---|
| Lauric+myristic | 45 |
| Palmitic, oleic and stearic | 54.1 |
| Capric and caprylic | 0.9 |

It is esterified as usual, is suitably refined and made up into the following composition:

| | Parts by weight |
|---|---|
| Oil | 155.0 |
| Glucose (50%) | 54.0 |
| "Amigen" (10%) | 36.0 |
| Gelatin (6%) | 22.0 |
| Water to make | 1000.0 |

The emulsion is made up and used as set forth in Example 1, with the same beneficial effects.

Example 3

The fatty acid mixture used is of the following composition:

| | Percent |
|---|---|
| Lauric | 40 |
| Myristic, palmitic, and stearic | 44 |
| Oleic | 4 |
| Capric and caprylic | 12 |

It is esterified as stated above with glycerine to form the substantially neutral esters and refined. The following composition is made:

| | Parts by weight |
|---|---|
| Oil | 108.0 |
| Glucose (50%) | 49.0 |
| "Amigen" (10%) | 40.0 |
| Gelatin (6%) | 24.0 |
| Water to make | 1000.0 |

The effectiveness of this composition is equal to that set forth in the above examples for the stated purposes.

Various modifications may be made in the details of the invention within the principles set forth herein. The invention contemplates an oil of the lauric-myristic type in which water-soluble acids are absent or present in very small amounts. Caproic acid being highly water-soluble should not be present and caprylic acid, being moderately soluble, should be kept quite low. Capric acid is but slightly soluble and more can be tolerated by the human system. It is believed that the water-soluble acids are readily taken up by the blood stream into which they are injected and change the pH thereof with resulting unfavorable reactions.

In place of "Amigen," other protein hydrolysates capable of being absorbed by the system may be used. As emulsifiers there may be used, in place of gelatin or in conjunction therewith, synthetic substances in small amounts, usually from .5% to 2%. Among such substances are the mono- and di-glycerides of fatty acids having from 12 to 18 carbon atoms, the partial esters of polyglycerol and fat-forming fatty acids, the monoglyceride of stearic acid, etc. The amount of oil in the emulsions may be increased and other desirable substances may be added thereto.

I claim:

1. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture contaning a major proportion of lauric and myristic acids and being substantially free from water-soluble acids.

2. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture containing a major proportion of lauric and myristic acids and being substantially free from water-soluble acids, and containing not over about 12% fatty acids having 8 and 10 carbon atoms.

3. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture containing a major proportion of lauric and myristic acids and being substantially free from water-soluble acids, and being substantially free from fatty acids having 8 and 10 carbon atoms.

4. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture containing a major proportion of lauric and myristic acids and being substantially free from water-soluble acids, said oil having a melting point below normal body temperature.

5. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture containing a major proportion of lauric and myristic acids and being substantially free from water-soluble acids, said emulsion containing not over 5% of an emulsifier taken from the class consisting of mono- and di-glycerides of higher fatty acids and polyethylene glycol esters of a mixture of fatty acids having 2 to 4 carbon atoms and 12 to 18 carbon atoms.

6. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture containing a major proportion of lauric and myristic acids and being substantially free from water-soluble acids, said emulsion containing at least 10% of said oil.

7. A composition for intravenous injection consisting essentially of a water emulsion of a fat which is the substantially neutral glyceride esters of a mixture of fatty acids derived from coconut type oil having from 12 to 18 carbon atoms and said esters being unhydrogenated, said mixture containing a major proportion of lauric and myristic acids and being substantially free from water-soluble acids, said emulsion containing glucose and casein hydrolysate.

References Cited in the file of this patent

UNITED STATES PATENTS

| 1,816,339 | Musher | July 28, 1931 |
| 2,185,969 | Schultze | Jan. 2, 1940 |

OTHER REFERENCES

Howard: Modern Drug Encyclopedia, 4th ed., Drug Publications, Inc., New York, p. 41.

Meng: J. Lab. & Clin. Med., vol. 33, pp. 689–690, 701 (1948).

Mann et al.: J. Lab. & Clin. Med., vol. 34, p. 699 (1949).

McKibbin: J. Lab. & Clin. Med., vol. 30, 1945, pp. 488–490.